US006607304B1

United States Patent
Lake et al.

(10) Patent No.: US 6,607,304 B1
(45) Date of Patent: Aug. 19, 2003

(54) MAGNETIC CLAMP FOR HOLDING FERROMAGNETIC ELEMENTS DURING CONNECTION THEREOF

(75) Inventors: Henry J. Lake, Sidney (CA); William Thomas Moore, Ottawa (CA); Robert Langer, Ottawa (CA); Wendy Cipera, Ottawa (CA); Abdul Jaleel J. Moidu, Nepean (CA)

(73) Assignee: JDS Uniphase Inc., Ottawa (CA)

( * ) Notice: Subject to any disclaimer, the term of this patent is extended or adjusted under 35 U.S.C. 154(b) by 111 days.

(21) Appl. No.: 09/678,798

(22) Filed: Oct. 4, 2000

(51) Int. Cl.[7] ................................................ G02B 6/38
(52) U.S. Cl. ...................................... 385/57; 385/58
(58) Field of Search .......................... 385/88–94, 52, 385/53, 57, 147

(56) References Cited

U.S. PATENT DOCUMENTS

| | | | | |
|---|---|---|---|---|
| 4,678,271 A | * | 7/1987 | Beaulieu | 385/134 |
| 4,775,211 A | | 10/1988 | Wondrazek et al. | 385/88 |
| 4,834,488 A | * | 5/1989 | Lee | 385/57 |
| 4,859,827 A | | 8/1989 | Coyle, Jr. et al. | 219/121.64 |
| 5,386,488 A | | 1/1995 | Oikawa | 385/92 |
| 6,053,392 A | | 4/2000 | Aebersold et al. | 228/5.7 |
| 6,213,650 B1 | * | 4/2001 | Moriyama et al. | 385/88 |

FOREIGN PATENT DOCUMENTS

| | | | |
|---|---|---|---|
| EP | 26 02 662 | 7/1977 | G02B/5/14 |
| EP | 0 286 319 | 10/1988 | G02B/6/42 |
| EP | 0 559 364 | 9/1993 | G02B/6/30 |
| JP | 60164709 | 8/1985 | G02B/6/36 |
| JP | 01310315 | 12/1989 | G02B/6/30 |

OTHER PUBLICATIONS

European Search Report Nov. 19, 2002.

* cited by examiner

*Primary Examiner*—Lynn Feild
*Assistant Examiner*—Son V. Nguyen
(74) *Attorney, Agent, or Firm*—Neil Teitelbaum

(57) ABSTRACT

A drive towards automation, particularly in the fiber optics industry, has necessitated the use of materials and methods better suited for use by machines. The present invention takes advantage of the magnetic properties of these materials to create a strong magnetic bond between separate elements while they are being connected. Two independently controllable chucks are used to align the elements in accordance with design requirements. After proper alignment, the elements are magnetically attracted together and then permanently fixed using any one of a variety of standards methods, such as welding. In the embodiment of the invention used specifically in the fiber optics industry, the alignment process includes measuring the light transmitted or reflected by the two elements.

20 Claims, 4 Drawing Sheets

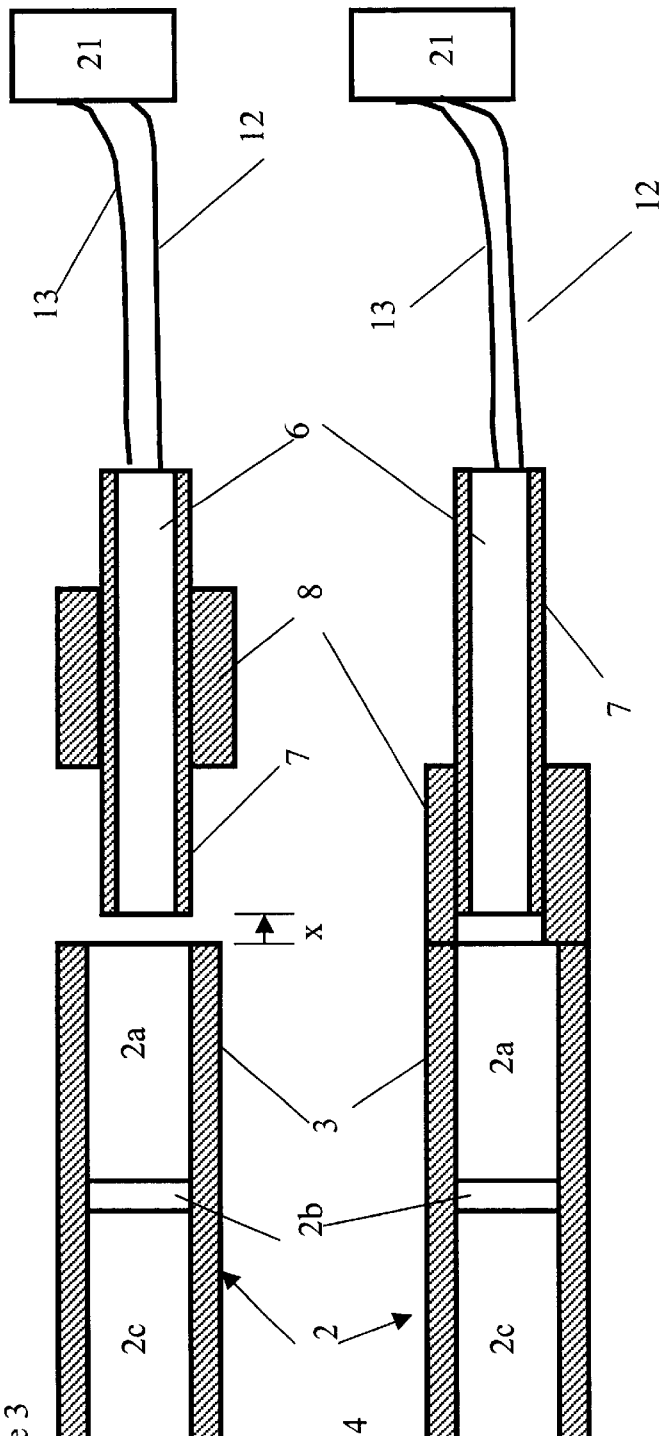
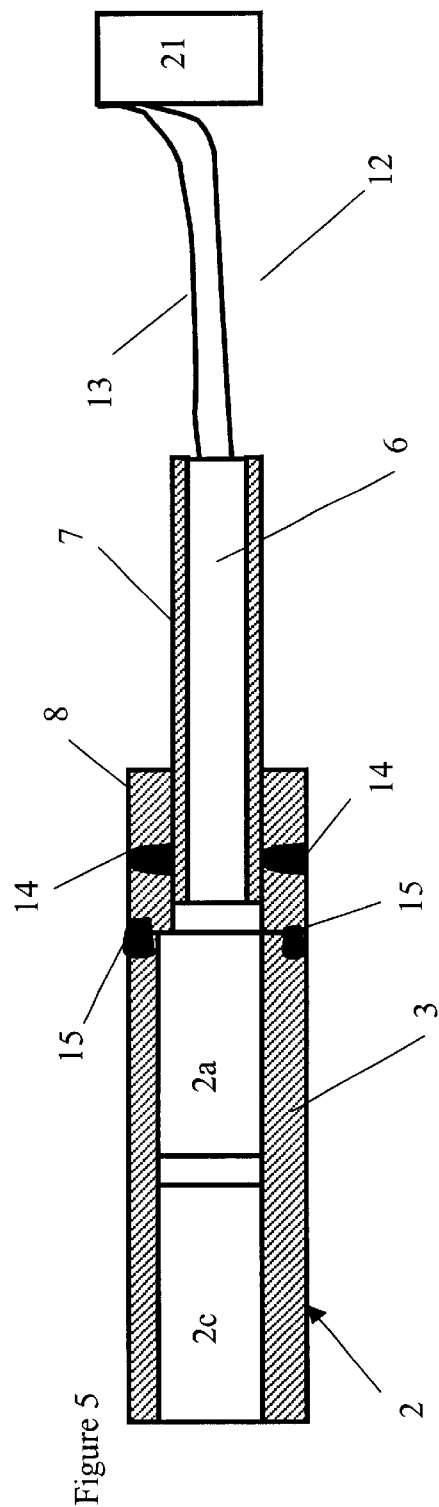
Figure 3
Figure 4
Figure 5

MAGNETIC CLAMP FOR HOLDING FERROMAGNETIC ELEMENTS DURING CONNECTION THEREOF

BACKGROUND OF THE INVENTION

The present invention relates to a method of and an apparatus for connecting two elements together, and in particular to a method of and an apparatus for magnetically holding two partially ferromagnetic elements together while they are being connected.

In the fiber optics industry, a recent push towards automation has forced manufacturers to rethink the standard products and processes, and consider other materials and methods that would make automation easier to implement. Conventionally, glue has been used to fix various elements used in fiber optics together. However, gluing can cause losses in signal strength, and is very difficult to automate. Therefore, the effectiveness of other attaching methods has been explored. One such alternative attaching method is welding. One of the major drawbacks with welding is that it is very difficult to align, hold and weld small elements with the precision required in the fiber optics field.

Some conventional welding machines use fork-shaped tools to hold the elements together while they are being welded. Unfortunately, these devices do not apply evenly distributed forces to the elements, which results in significant shifts during welding. This misalignment is compounded by any post-weld shift, which occurs when the molten metal contracts during solidification, resulting in the two surfaces being pulled together.

One method that has been developed in an attempt to overcome these problems is disclosed in U.S. Pat. No. 5,386,488 issued Jan. 31, 1995 in the name of Yoichi Oikawa. This method still uses a fork-shaped clamping tool to hold the elements during welding, but it overcomes some of the disadvantages of the prior art by placing a jig in between the clamping tool and one of the elements in an attempt to distribute the forces more evenly. The drawbacks in this invention include the need for a large number of welds to hold all the elements together, and the need for the specially designed jig. Each welding step could cause a minor misalignment, which would require an extra realignment step. This delay would greatly increase the cost and time of manufacture for each part. Similarly, the manufacture and application of the jig will also greatly increase the manufacturing time and cost.

An object of the present invention is to overcome the shortcomings of the prior art by providing a connecting apparatus that applies a relatively evenly distributed force, and a connecting method that does not require any additional fixing steps.

SUMMARY OF THE INVENTION

Accordingly, the present invention relates to a method of connecting two elements together, comprising the steps of:

securing a first element, having a first ferromagnetic connecting portion, in a first holding means;

securing a second element, having a second ferromagnetic connecting portion, in a second holding means, at least one of the first and second holding means being movable to adjust the relative position of the first and second elements;

aligning the first element with the second element by moving at least one of the first and second holding means relative to the other to position the first and second elements into a desired alignment;

magnetizing one of the first or second ferromagnetic connecting portions to attract the other of the first or second ferromagnetic connecting portions thereto;

releasing the element with the other ferromagnetic connecting portion from its holding means, whereby magnetic attraction between the first and second ferromagnetic connecting portions hold the first and second elements together; and fixing the first and second elements together.

Another aspect of the present invention relates to an apparatus for connecting two elements together, comprising:

a first holding means for securing a first element therein, the first element having a first ferromagnetic connecting portion;

a second holding means for securing a second element therein, the second element having a second ferromagnetic connecting portion, at least one of the first and second holding means being movable relative to the other;

aligning means for moving at least one of the first and second holding means relative to the other to position the first and second elements into a desired alignment;

magnetizing means for magnetizing one of the first or second ferromagnetic connecting portions, whereby the other of the first or second ferromagnetic connecting portions is attracted thereto; and fixing means for fixing the first element to the second element;

whereby, when the aligning means moves the two elements into alignment, the magnetizing means is; activated, the element with the other of the first or second ferromagnetic connecting portion is released from its holding means, and magnetic attraction between the first and second ferromagnetic connecting portions hold the first and second elements together while the fixing means fixes the two elements together.

BRIEF DESCRIPTION OF THE DRAWINGS

The present invention will be described in greater detail with reference to the accompanying drawings, which represent a preferred embodiment, wherein:

FIGS. 3 to 5 are schematic partly-sectioned side views of the elements to be connected, illustrated in FIGS. 1 and 2, at various stages in the connecting process.

DETAILED DESCRIPTION

Figure 1:
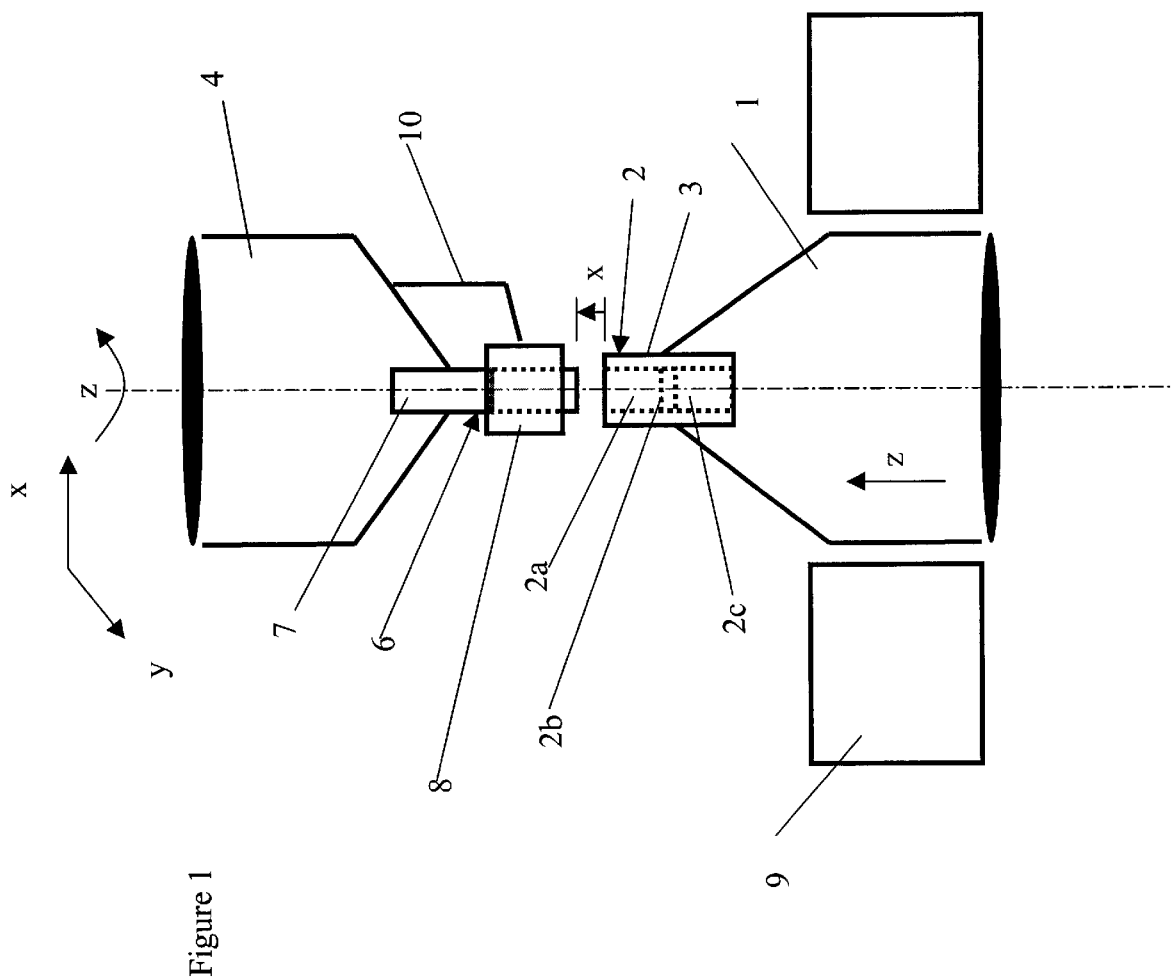
FIG. 1 is a schematic side view of the connecting apparatus according to the present invention in an initial loading stage.

With reference to FIG. 1, the apparatus, according to the present invention, includes a first holding chuck 1 for securing a first element therein. In a preferred embodiment the first element is a cylindrical fiber-optical centerpiece 2 containing a collimating lens 2a, an optical filter 2b, and a focusing lens 2c. The first element includes a ferromagnetic connecting portion, which in the preferred embodiment is the entire outer housing 3 of the centerpiece 2.

A second holding chuck 4 is provided for securing a second element therein. In the preferred embodiment the second element is a cylindrical fiber-optic ferrule 6, with a ferromagnetic outer sleeve 7, containing one or more optic fibers. The second element also includes a ferromagnetic connecting portion, which in the preferred embodiment is a cylindrical welding sleeve 8. The welding sleeve 8 is initially mounted, but not fixed, on the ferromagnetic outer sleeve 7 and is held independently of the ferrule 6 by an arm 10.

In order to align the two optical elements, the first and second holding chucks 1 and 4 must be relatively adjustable. In a preferred embodiment the second holding chuck 4 is adjustable both laterally, in the x and y directions, and rotatably about the z axis, in the θ direction. Accordingly, the first holding chuck 1 need only be adjustable in the z direction. Obviously, it is possible to coordinate other adjustment scenarios as long as all of the required degrees of freedom are adjustable. The precision required in the alignment of the two elements is totally dependent upon the final use of the combined elements. When the elements are elements of an optical coupling device, the accuracy and precision of the alignment is of utmost importance, requiring a detailed procedure. However, other uses of this invention are possible in which less complicated, even manual, adjustment is possible.

Figure 2:
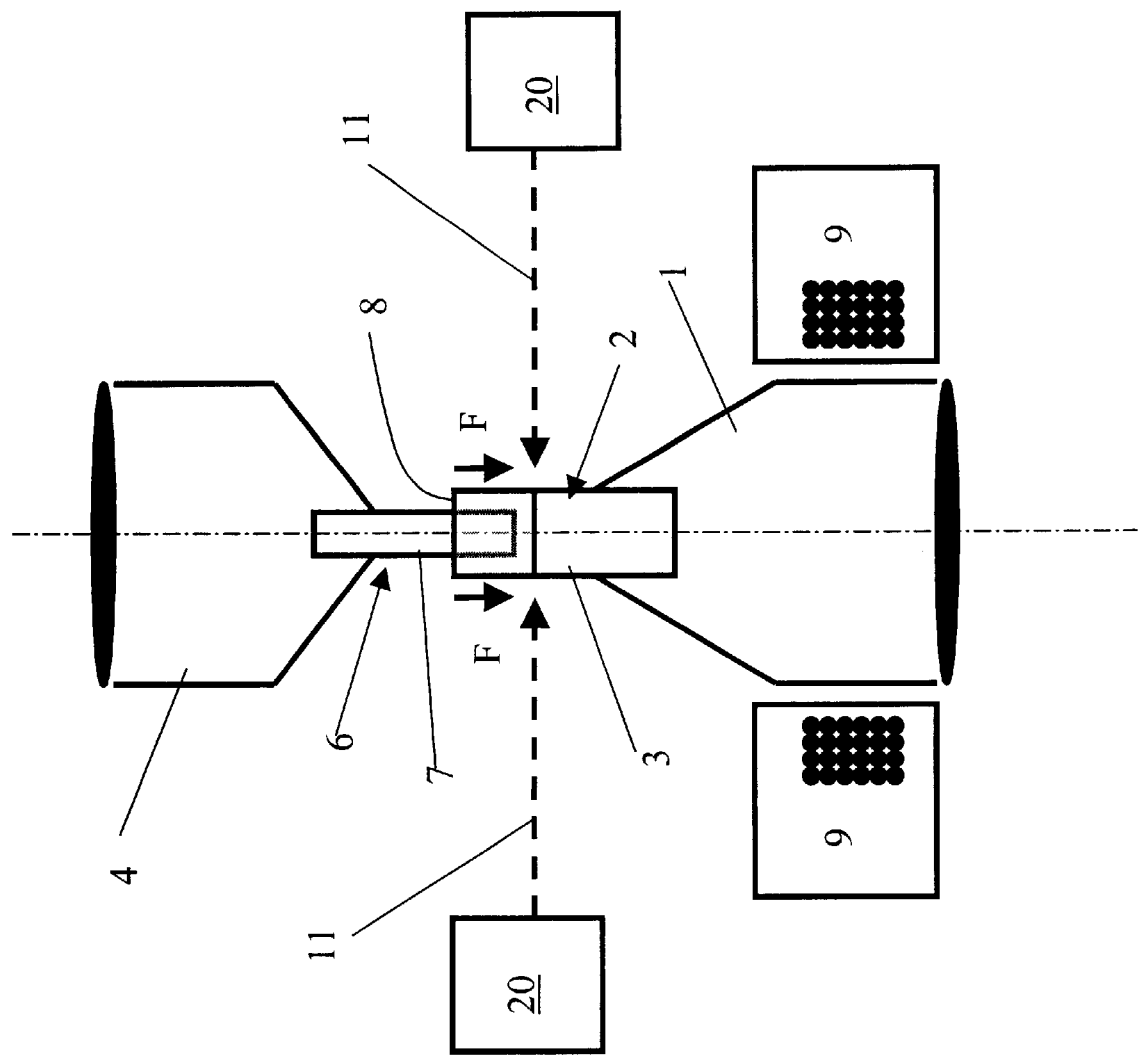
FIG. 2 is a schematic side view of the connecting apparatus, illustrated in FIG. 1, in a subsequent welding stage.

When the first optical element (centerpiece 2) is aligned with the second optical element (ferrule 6), one of the ferromagnetic connecting portions is magnetized, thereby attracting the other ferromagnetic connecting portion, so that when the other ferromagnetic connecting portion is released from its holding chuck the two elements will be held together in the correct alignment. In a first embodiment (FIG. 2), the centerpiece housing 3 is magnetized which attracts the ferrule's welding sleeve 8, which in this case is already attached to the ferrule 6. Activating an electric coil 9, which is wrapped around the holding chuck 1, magnetizes the housing 3 of the centerpiece 2. The resulting electromagnet generates an evenly distributed force F with enough magnitude that the two elements are held together, enabling the two ferromagnetic connecting portions to be fixed together. Preferably, the welding sleeve 8 is welded to the centerpiece housing 3 using laser welders 20, which launch beams, indicated by arrows 11.

In a preferred embodiment, the ferromagnetic connecting portion (welding sleeve 8) of the second element (ferrule 6) is not initially fixed to the ferromagnetic outer sleeve 7. In this case, during initial alignment, a gap x is intentionally left between the ferrule 6 and the centerpiece 2. Accordingly, when the coil 9 is activated, the welding sleeve 8, after being released from the arm 10 of the second holding chuck 4, slides along the ferromagnetic outer sleeve 7 until it abuts the centerpiece housing 3, thereby covering the gap x. The ferromagnetic outer sleeve 7 of the ferrule 6 is then welded to the welding sleeve 8, and the welding sleeve 8 is subsequently welded to the centerpiece housing 3. Between welding stages the electric coil 9 can be deactivated, while the ferrule 6 is realigned with the centerpiece 2, and then re-energized for the final welding stage.

However, as stated above, it is also within the scope of this invention to have the ferromagnetic connecting portion of the first element fixed thereto, whereby, when the first ferromagnetic connecting portion is magnetized, the second element along with its ferromagnetic connecting portion are released from the second holding chuck and held against the first element.

The method of the present invention will be described with reference to the preferred embodiment in which the first and second elements are elements of an optical coupling device. However, other embodiments of the invention are possible, in which different devices are manufactured, e.g. optical switches with ferromagnetic elements. The first steps in the process relate to securing the centerpiece 2 in the holding chuck 1, and securing the ferrule 6 in the holding chuck 4. With reference to FIG. 3, the first ferrule 6 to be connected to the centerpiece 2 contains the ends of two optical fibers 12 and 13. Optical fiber 12 is an input fiber, while optical fiber 13 carries the light reflected by the optical filter 2b in the centerpiece 2.

The second holding chuck 4 lowers the ferrule 6 into close proximity of the centerpiece 2, while still maintaining a gap x therebetween. To determine whether the two optical elements are in proper alignment, light is fed through the input optical fiber 12 and the amount of reflected light in the optical fiber 13 is compared with a predetermined threshold by a light-measuring device 21. For each adjustment in the z direction made by the first holding chuck 1, the second holding chuck 4 makes various adjustments in the x, y and θ directions. In other words the ferrule 6 is moved from side to side, back and forth, and rotated about its longitudinal axis in an effort to determine the best position. Obviously, these steps can be automated and directed by a computer.

When the best position is found the coils 9 are activated, thereby magnetizing the centerpiece housing 3. Then the ferromagnetic welding sleeve 8 is released and drawn into contact with the housing 3 due to its magnetism. At which point a laser welder 20 applies welds 14 to fix the welding sleeve 8 to the ferrule's outer sleeve 7. To ensure that this welding step has not caused a misalignment between the ferrule 6 and the centerpiece 2, the electromagnet 9 is deactivated and the alignment is re-tested. Accordingly, the necessary adjustments are then made by the first and/or second holding chucks 1 and 4. When the elements are in alignment again, the electromagnet 9 is reactivated, the welding sleeve 8 is magnetically held in contact with the centerpiece housing 3, and the laser welder 20 applies welds 15 to fix the welding sleeve 8 and the centerpiece housing 3 together.

Once again a test is done by a light-measuring device 21 to determine whether welding has caused a substantial misalignment between the elements. In this case forces $F_2$ are repeatedly applied to several locations on the outer free end of the ferrule 6 by a realigning device 25 to determine the magnitude and direction of an optimum force required to tilt the ferrule 6 into a position in which there is improved light reflection in the optical fiber 13. When the best position is determined, one or more asymmetrical spot welds 22, which generate a force equivalent to the aforementioned optimum force, are applied to the welding sleeve 8.

Figure 6:
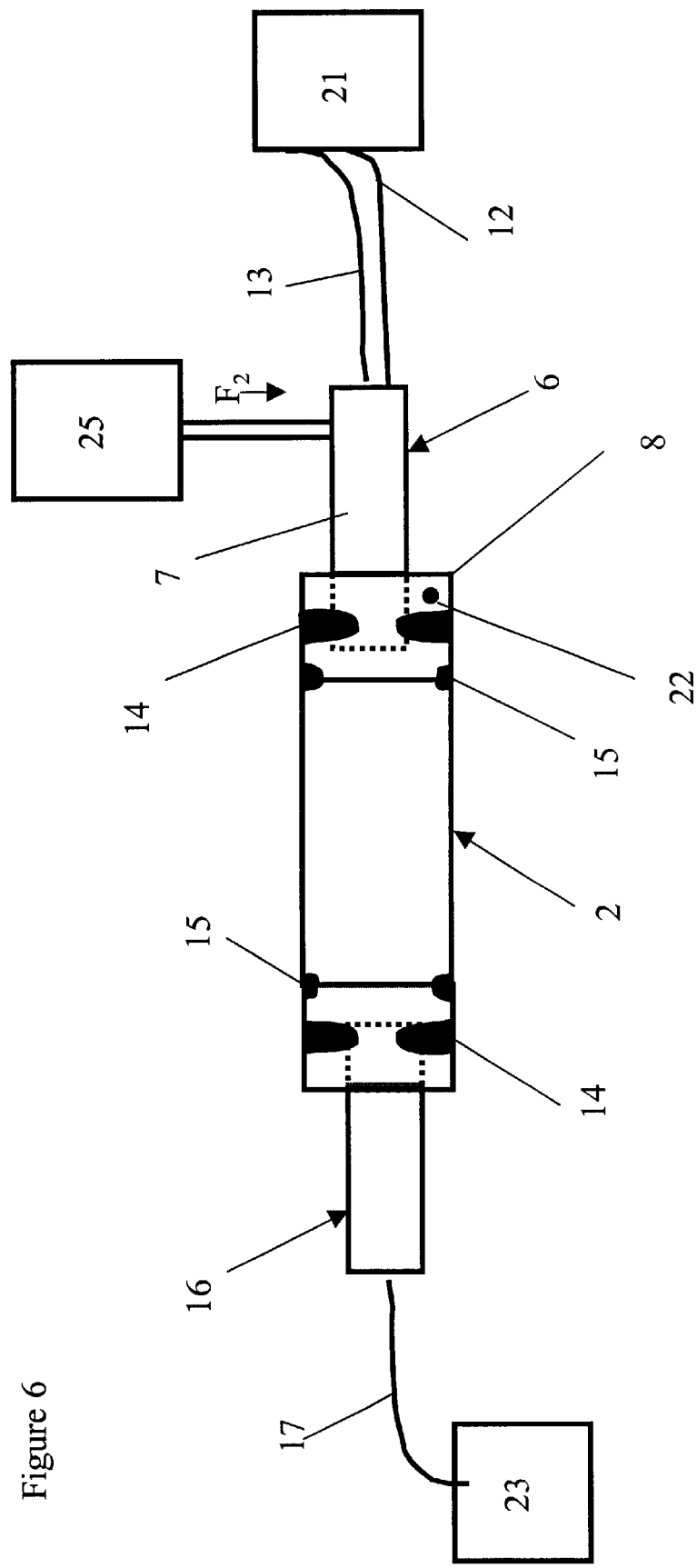
FIG. 6 is a schematic side view of a finished product in accordance with a preferred embodiment of the process of the present invention.

The above process is repeated for a second ferrule 16, (FIG. 6) which has a single transmission optical fiber 17 therein. However, to test the alignment of ferrule 16 with centerpiece 2, light is transmitted through input fiber 12 and measured in transmission fiber 17 by a light-measuring device 23.

What we claim is:

1. A method of connecting two elements together, comprising the steps of:

securing a first element, having a first ferromagnetic connecting portion, in a first holding means;

securing a second element, having a second ferromagnetic connecting portion, in a second holding means;

aligning said first element with said second element by moving at least one of said first and second holding means to position the first and second elements in a desired alignment;

magnetizing the first ferromagnetic connecting portion to attract the second ferromagnetic connecting portion to the first ferromagnetic connecting portion;

releasing the second element from the second holding means, whereby magnetic attraction between the first and second ferromagnetic connecting portions hold the first and second elements together; and fixing the first and second elements together.

2. The method according to claim 1, wherein the second ferromagnetic connecting portion is a sleeve initially slideable on another portion of the second element; wherein the sleeve is secured in a third holding means; and wherein prior to the release of the second element from the second holding means the sleeve is released from the third holding means, magnetically drawn into contact with the first element, and fixed to the second element.

3. The method according to claim 1, wherein the two elements are elements of an optical coupling device, which has at least one input waveguide and at least one output waveguide; and wherein the aligning step includes ensuring that at least one of the input waveguides is optically coupled with at least one of the output waveguides.

4. The method according to claim 1, wherein the fixing step comprises welding the first and second ferromagnetic connecting portions together.

5. The method according to claim 4, wherein the fixing step comprises laser welding the first and second ferromagnetic connecting portions together.

6. The method according to claim 1, wherein the magnetizing step includes activating an electric coil surrounding one of the first or second holding means.

7. The method according to claim 1, wherein the first holding means is adjustable in x, y, and θ directions; wherein the second holding means is adjustable in a z direction; and wherein the aligning step includes adjusting the first holding means in the x, y and θ directions for each z direction adjustment made by the second holding means.

8. The method according to claim 1, wherein the first element is a wavelength division multiplexer centerpiece including an optical filter positioned in a ferromagnetic housing; and wherein the second element is a fiber-optic ferrule with a ferromagnetic welding sleeve as its ferromagnetic connecting portion.

9. The method according to claim 8, wherein the ferromagnetic welding sleeve is initially movable relative to said fiber-optic ferrule; wherein the welding sleeve is initially held in a third holding means; wherein the aligning step includes determining an appropriate gap between the ferromagnetic ferrule and the centerpiece; wherein the magnetizing step includes magnetizing the centerpiece; wherein prior to releasing the fiber-optic ferrule, the welding sleeve is released from the third holding means, and magnetically drawn into contact with the centerpiece; and wherein the fixing step includes: a) welding the ferrule to the welding sleeve, and b) welding the welding sleeve to one end of the centerpiece.

10. The method according to claim 9, wherein between a) and b) the fixing step further includes:

deactivating the electric coil;

realigning the ferrule with the centerpiece; and activating the electric coil.

11. The method according to claim 10, wherein after b) the fixing step further comprises realigning the ferrule relative to the centerpiece by determining an angular deflection of the ferrule required to increase optical coupling efficiency therebetween, and by applying at least one eccentric weld to the welding sleeve to substantially achieve the required angular deflection.

12. The method according to claim 8, wherein the fiber-optic ferrule contains one end of a first input fiber and one end of a second fiber, which transmits light reflected by the filter; and wherein the aligning step includes measuring light transmitted through the first fiber to the second fiber, and determining whether the amount of light transmitted to the second fiber is above a predetermined threshold.

13. The method according to claim 1, further comprising determining an angular deflection of the second element required to improve the alignment of the first and second fixed elements, and applying at least one eccentric weld to the second ferromagnetic connecting portion to substantially achieve the required deflection.

14. An apparatus for connecting two elements together, comprising:

a first holding means for securing a first element therein, said first element having a first ferromagnetic connecting portion;

a second holding means for securing a second element therein, said second element having a second ferromagnetic connecting portion aligning means for moving at least one of said first and second holding means to position the first and second elements in a desired alignment;

magnetizing means for magnetizing the first ferromagnetic connecting portion, whereby the second ferromagnetic connecting portion is attracted; and fixing means for fixing the first element relative to the second element;

whereby, when the aligning means moves the two elements into alignment, the magnetizing means is activated, the second element is released from the second holding means, and magnetic attraction between the first and second ferromagnetic connecting portions holds the first and second elements together while the fixing means fixes the first element to the second element.

15. The apparatus according to claim 14, wherein the second ferromagnetic connecting portion is a sleeve initially slideable on another portion of the second element; wherein the sleeve is secured in a third holding means; and wherein prior to the release of the second element from the second holding means, the sleeve is released from the third holding means, magnetically drawn into contact with the first element, and fixed to the second element.

16. The apparatus according to claim 14, wherein the first and second elements are elements of an optical coupling device, which has at least one input waveguide and at least one output waveguide; and wherein the aligning means ensures that at least one of the input waveguides is optically coupled with at least one of the output waveguides before the magnetizing means is activated.

17. The apparatus according to claim 16, wherein the aligning means includes light measuring means for determining whether the amount of light transmitted from one of the input waveguides to one of the output waveguides is above a predetermined threshold.

18. The apparatus according to claim 14, wherein the fixing means comprises welding means for welding the two ferromagnetic portions together.

19. The apparatus according to claim 14, further comprising realigning means for adjusting the alignment of the first and second elements, after being fixed, by determining an angular deflection of the second element required to improve the alignment of the first and second elements, and by applying at least one eccentric weld to the second ferromagnetic connecting portion to substantially achieve the required angular deflection.

20. The apparatus according to claim 14, wherein the second holding means is adjustable in x, y and θ directions; and wherein the first holding means is adjustable in a z direction.

* * * * *